Patented June 3, 1952

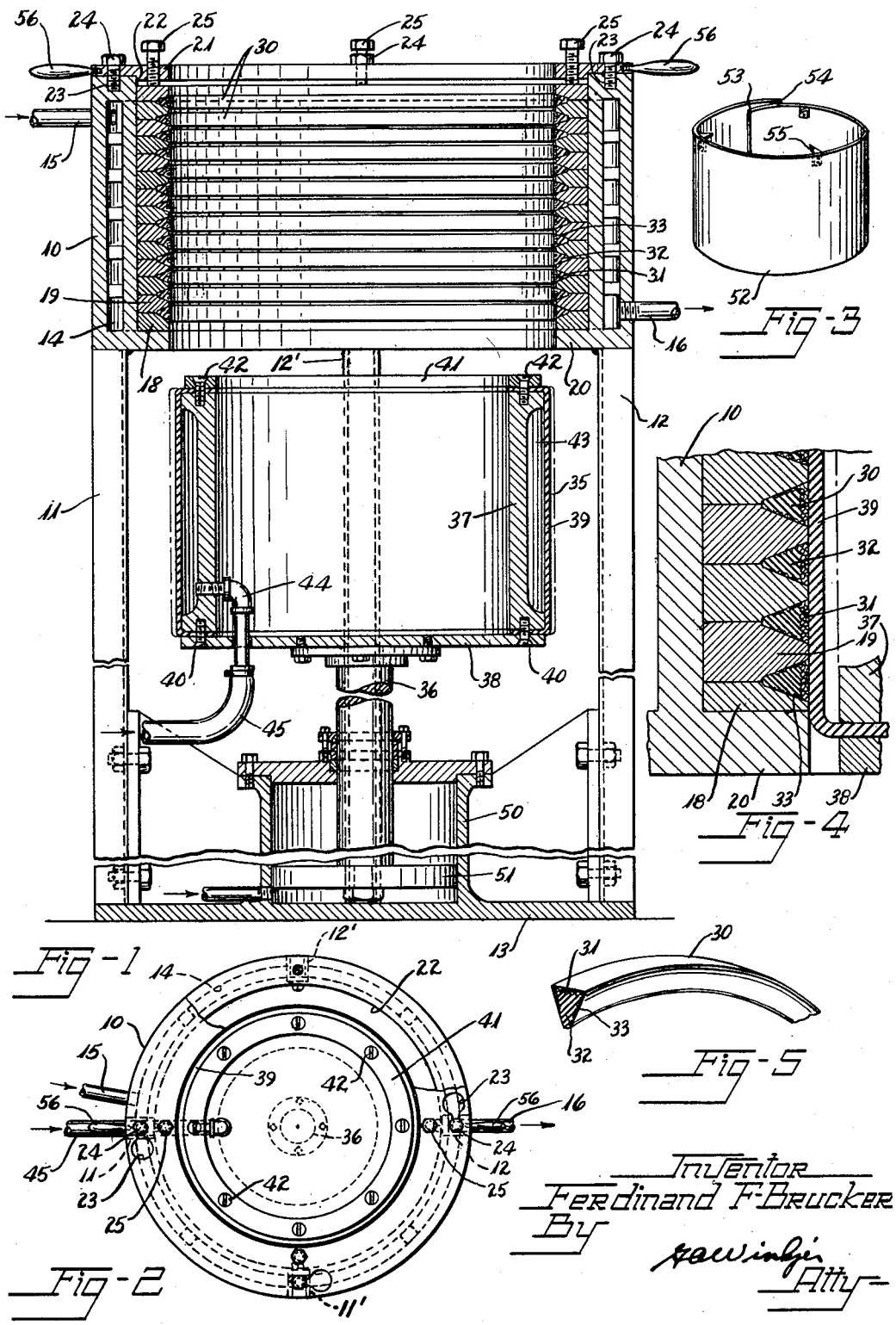

2,599,046

UNITED STATES PATENT OFFICE 2,599,046

VULCANIZING ANNULAR ARTICLES

Ferdinand F. Brucker, Akron, Ohio, assignor to The B. F. Goodrich Company, New York, N. Y., a corporation of New York Application November 29, 1947, Serial No. 788,893

3 Claims. (Cl. 18—6)

This invention relates to the vulcanizing of annular articles and is especially useful in the manufacture of endless transmission belts or other annular articles of rubber-like material having tension-resisting reinforcements.

In the manufacture of annular V-belts it has been proposed to build the articles about a cylindrical drum and to vulcanize them thereon under heat and radial inwardly directed pressure applied by wrapping or molding devices. Such procedure has the disadvantage that longitudinal reinforcing members of the belt may not be properly tensioned during the vulcanizing step and may even be in slack or buckled condition.

It has also been proposed to remove the articles from the drums upon which they are built and to stretch them about mold members of larger circumference during vulcanizing of the belts. Such a procedure, however, while tensioning the tension members tends to cause them to displace the rubber-like material, causing the tension members to move inwardly from their desired position during the vulcanizing of the belt.

It is an object of the present invention to overcome the foregoing and other difficulties.

Other objects of the invention are to mold the annular articles in inside out or reversed position, to provide for tensioning the belts during the vulcanizing operation, to provide for applying confining pressure to the articles by radial outwardly directed force during the vulcanizing step, to provide a seamless expansible molding surface for contact with the article from within, to provide for maintaining the position of the tension members during vulcanization of the article, to provide for quick loading and unloading of the vulcanizing apparatus, and to provide a novel and simple apparatus for vulcanizing annular articles under tension.

These and other objects will appear from the following description and the accompanying drawings.

Of the drawings,

Fig. 1 is a cross sectional elevation of apparatus constructed in accordance with and embodying the invention, parts being broken away.

Fig. 2 is a plan view thereof.

Fig. 3 is a perspective view of a band for use with the apparatus.

Fig. 4 is a detail sectional view of the apparatus of Fig. 1 with the inner molding member expanded and the belts in place, parts being broken away.

Fig. 5 is a perspective view of a portion of a belt in running position.

Referring to the drawings, the numeral 10 designates a cylindrical molding member supported by frame members 11, 11', 12, 12' from a base 13. The molding member 10 is chambered, as at 14 and pipes 15, 16 are connected to the chamber to circulate a heating fluid such as steam therethrough. For convenience of loading and unloading the outer mold member is made of separable parts. To this end, the inner surface of the molding member is machined to provide full circle contact with a series of annular mold rings 18, 19 slideably fitted therein and supported by an inwardly directed flange 20 thereof. The rings 18, 19 are adapted to be stacked within the bore of the molding member in heat conductive contact therewith. A removable cover ring 21 is formed with a dowel shoulder 22 for centering it with the molding member and has button-hole apertures 23 therethrough for engaging stud bolts 24 by rotation of the ring in bayonet joint fashion. Set screws 25 threaded through the cover ring are adapted to engage the top ring of the stack for holding the mold rings in contact with each other.

The mold rings 18, 19 are formed with inwardly open belt cavities of V-belt form in cross section between them, one conical face of the V-belt being molded by each of two adjacent rings. The arrangement is such that V-belts 30 in inside out or reversed condition may be assembled between adjacent molding rings. Overflow cavities (not shown) may be formed between adjacent rings near the belt cavities to receive overflow of rubber material.

Each V-belt 30 has a layer 31 of cords or wires in its tension zone or at the widest portion of the belt which in the reversed or inside out condition of the belt is adjacent its inner face. A body of rubber-like material 32 is at its narrow face and a cover of fabric 33 may surround the rubber-like material and the tension members.

For pressing the belts radially outward and expanding them into the mold cavities, a second molding member 35 is supported on a piston rod 36 for movement into and out of the member 10. The member 35 is preferably in the form of a cylindrical drum 37 mounted on a plate 38. An expansible diaphragm 39 extends about the drum 37 and is secured thereto at its lower margin by being clamped between the drum 37 and the plate 38, as by bolts 40, and at its upper margin by being clamped against the end of the drum by a clamp ring 41 held thereto by screws 42. An annular cavity 43 is provided between the cylindrical face of the drum and the diaphragm and is fluid tight except for a pipe connection 44 thereto. A flexible hose 45 connects the pipe 44 to any convenient source of fluid pressure (not shown). The member 35 is of such dimensions that when the diaphragm is uninflated, it may be passed axially into and out of the member 10 with the mold rings and belts in place, and when the diaphragm is inflated, the belts will be pressed thereby against the outer mold member. Where steam is employed to expand the diaphragm and heat the mold members, an additional outlet connection may be provided.

For raising and lowering the inner mold members 35, a fluid pressure operated cylinder 50 is mounted on the base plate 13 and has a piston 51 connected to the piston rod 36 which supports the inner moldig member 35.

When it is desired to provide a smoother surface on the cylindrical faces of the belts than that provided by the pressure of the diaphragm directly thereon, a discontinuous sleeve 52 of sheet metal of such length circumferentially as to provide overlapping ends 53, 54 may be slipped over the inner molding member 35, and inwardly directed stop brackets 55 may be provided on the sleeve to engage over the ring 41 to hold the sleeve in place.

The ring 21 may be provided with radially extending handles 56 for turning it and locking it to the molding member 10 and for lifting it when released.

In using the apparatus, the unvulcanized belt bodies 30, which may be formed either in inside out condition or in normal condition and then turned inside out before vulcanization, are placed between ring members 18, 19, the rings and belt bodies being placed in succession within the outer vulcanizing member 10. The inner vulcanizing member is then raised to place it within the outer vulcanizing member, the ring 21 is placed on the outer vulcanizing member and turned to lock it in place, and the screws 25 forced against the upper ring mold. Fluid under pressure is then introduced through pipe 44 to expand the diaphragm against the belts. As the layer of cords 31 is at the inner face of the belts, the cords are stretched as the belts are seated in the molding grooves by pressure of the diaphragm.

After vulcanization is complete, the pipe 44 is opened to atmospheric pressure permitting the diaphragm to contract. The member 35 is then lowered by exhausting cylinder 50. The ring 21 is then removed and the molding rings and belts are then removed and separated. The belts may then be turned right side out to bring their cord tension members to the outer face of the belts.

The diaphragm 39 may be of rubber or other elastic material with or without cord or fabric reinforcement. Compressed air or other fluid may be employed for expanding it against the belts. Where steam or other heated fluid is used for expanding it, the fluid will also assist in providing vulcanizing heat. As the diaphragm has a smooth continuous surface, no mold marks are left on the belts thereby.

Variations may be made without departing from the scope of the invention as it is defined by the following claims.

I claim:

1. Apparatus for vulcanizing an endless V-belt of rubber-like material having circumferential reinforcing tension elements therein, said apparatus comprising an outer mold member having a bore therethrough from end to end thereof and a continuous annular wall having a continuous heat-transmitting smooth internal surface in said bore, said wall terminating at one of said ends in an annular support flange extending laterally inward in said bore, means carried by said wall for heating said internal surface, a plurality of molding rings presenting a smooth outer peripheral face slidably and removably mounted in said bore of said mold member and mounted on said support flange with said outer peripheral face of said molding rings contacting said internal surface of said wall in heat-transmitting relation therewith, said molding rings being fitted together in mating relation so as to define around the inner periphery thereof at least one continuous V-shaped belt-molding groove for receiving an endless V-belt substantially entirely within said groove with the inner peripheral face of the V-belt exposed and with the tension elements of the V-belt nearest said peripheral face thereof and extending peripherally around said groove, means at the other end of said mold member for clamping said molding rings together in said mating relation while holding the same mounted on said support flange, an inner mold member including a peripherally continuous expansible diaphragm mounted in alignment with said bore beyond the flanged end of said outer mold member for movement of said inner mold member to and away from a position in said bore of said outer mold member such that said diaphragm is in adjacent telescopic overlapping relation to said inner periphery of said molding rings, means operable to move said inner mold member telescopically through said support flange into and out of said bore of the outer mold member and to and from said position therein while said molding rings are mounted in said bore, and means for expanding said diaphragm when said inner mold member is at said position within the outer mold member, so as to force the V-belt into said groove and stretch the tension elements of the V-belt uniformly about the entire circumference thereof.

2. Apparatus for vulcanizing a plurality of endless V-belts of rubber-like material having circumferential reinforcing tension elements therein, said apparatus comprising an outer mold member having a bore therethrough from end to end thereof and a continuous cylindrical wall having a continuous heat-transmitting smooth cylindrical internal surface in said bore, said wall terminating at one of said ends in a continuous annular support flange extending laterally inward in said bore, means in said wall for heating said internal surface, a plurality of molding rings presenting a smooth cylindrical outer peripheral face slidably and removably mounted in said bore of said mold member and mounted on said support flange with said outer peripheral face of said molding rings contacting said internal surface of said wall in heat-transmitting relation therewith, said molding rings being fitted together in mating relation so as to define around the inner periphery thereof a plurality of spaced-apart continuous V-shaped belt-molding grooves for receiving endless V-belts substantially entirely within said grooves with the inner peripheral faces of the V-belts exposed and with the tension elements of the V-belts nearest said peripheral faces thereof and extending peripherally around said grooves, means at the other end of said mold member for clamping said molding rings together in said mating relation while holding the same mounted on said support flange, a tubular inner mold member of cylindrical form including a peripherally continuous cylindrical expansible diaphragm mounted in alignment with said bore beyond the flanged end of said outer mold member for movement of said inner mold member to and away from a position in said bore of said outer mold member such that said diaphragm is in adjacent telescopic overlapping relation to said inner periphery of said molding rings, means operable to move said inner mold member telescopically through said support flange into and out of said bore of the outer mold member and to and from said position therein while said molding rings are mounted in said bore, and means for expanding said diaphragm when said inner mold member is at said position within the outer mold member, so as to force said V-belts into said grooves and stretch the tension elements of the V-belts uniformly about the entire circumference thereof.

3. Apparatus for vulcanizing a plurality of endless V-belts of rubber-like material having circumferential reinforcing tension elements therein as defined in claim 2 in which said inner mold member of cylindrical form includes a detachable divided sleeve of smooth metal material having overlapping ends and disposed on said diaphragm in telescopic overlying and overlapping relation therewith to present a smooth cylindrical outer face of said sleeve to said grooves for contacting said inner peripheral faces of the V-belts therein upon expansion of said diaphragm.

FERDINAND F. BRUCKER.

REFERENCES CITED

The following references are of record in the file of this patent:

UNITED STATES PATENTS

| Number | Name | Date |
| --- | --- | --- |
| 270,342 | Sargent | Jan. 9, 1883 |
| 350,654 | Benjamin | Oct. 12, 1886 |
| 890,409 | Cox | June 9, 1908 |
| 1,023,764 | Senac | Apr. 16, 1912 |
| 1,432,973 | Delzell | Oct. 24, 1922 |
| 2,253,792 | Leavenworth | Aug. 26, 1941 |
| 2,292,290 | Robins | Aug. 4, 1942 |
| 2,363,107 | Young | Nov. 21, 1944 |
| 2,420,278 | Yelm | May 6, 1947 |
| 2,440,087 | Green | Apr. 20, 1948 |
| 2,573,643 | Hurry | Oct. 30, 1951 |